United States Patent
Indurkhya et al.

(10) Patent No.: US 11,481,939 B2
(45) Date of Patent: Oct. 25, 2022

(54) SYSTEMS AND METHODS FOR 3D DATA VISUALIZATION AND NETWORK EXTRACTION

(71) Applicant: Virtualitics, Inc., Pasadena, CA (US)

(72) Inventors: Aakash Indurkhya, Pasadena, CA (US); Ciro Donalek, Pasadena, CA (US); Michael Amori, Pasadena, CA (US); Sarthak Sahu, Pasadena, CA (US); Vaibhav Anand, Pasadena, CA (US); Justin Gantenberg, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 17/157,819

(22) Filed: Jan. 25, 2021

(65) Prior Publication Data

US 2021/0233295 A1    Jul. 29, 2021

Related U.S. Application Data

(60) Provisional application No. 62/965,112, filed on Jan. 23, 2020.

(51) Int. Cl.
*G06T 11/20* (2006.01)
*G06T 1/60* (2006.01)
(Continued)

(52) U.S. Cl.
CPC .......... *G06T 11/206* (2013.01); *G06F 16/904* (2019.01); *G06F 16/9024* (2019.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 10,621,762 B2 | 4/2020 | Donalek et al. | |
| 2017/0242957 A1* | 8/2017 | Han | G16B 20/20 |

(Continued)

OTHER PUBLICATIONS

Lima et al, 'Graph-based Relational Data Visualization', IEEE 17th Intl. Conf. on Information Visualization, pp. 210-219. (Year: 2013).*

(Continued)

*Primary Examiner* — Patrick F Valdez
(74) *Attorney, Agent, or Firm* — KPPB LLP

(57) ABSTRACT

Systems and methods for data visualization and network extraction in accordance with embodiments of the invention are illustrated. One embodiment includes a method including obtaining a graph comprising a plurality of nodes and a plurality of edges, identifying a plurality of communities in the graph, where each community includes nodes from the plurality of nodes, generating a community graph structure based on the identified communities, where the community graph includes a plurality of supernodes and a plurality of superedges, spatializing the community graph structure, unpacking the spatialized community graph structure into an unpacked graph structure comprising the plurality of nodes and the plurality of edges, where each node in the plurality of nodes is located at approximately the position of the supernode that represented it, spatializing the unpacked graph structure, and providing the spatialized unpacked graph structure.

16 Claims, 7 Drawing Sheets

(51) Int. Cl.
　　*G06F 16/904*　　(2019.01)
　　*G06F 16/901*　　(2019.01)
　　*G06T 1/20*　　(2006.01)

(56) References Cited

U.S. PATENT DOCUMENTS

2019/0221039 A1* 7/2019 Korkin .................. G06T 19/006
2019/0272479 A1* 9/2019 Mars ...................... G06N 20/00

OTHER PUBLICATIONS

Liu et al, 'Learning Markov Clustering Networks for Scene Text Detection', arXiv:1805.08365v1 [cs.CV], (Year: 2018).*

Minaei-Bidgoli et al., 'A Comparison of Resampling Methods for Clustering Ensembles', MLMTA'04. (Year: 2004).*

"Force Atlas 2", printed Jan. 18, 2021 from https://github.com/gephi/dephi/wiki/Force-Atlas-2, 3 pgs.

"Jaccard index", Wikipedia, Retrieved from: https://en.wikipedia.org/wiki/Jaccard_index, Last updated Jun. 7, 2020, 9 pgs.

"Louvain modularity", Wikipedia, Retrieved from: https://en.wikipedia.org/wiki/Louvain_modularity, Last updated Jun. 3, 2020, 5 pgs.

"MCL—a cluster algorithm for graphs", Retrieved as of Jul. 3, 2013 from https://web.archive.org/web/20130703110235/https://micans.org/mcl/, 1 pg.

"Modularity (networks)", Wikipedia, Retrieved from: https://en.wikipedia.org/wiki/Modularity_(networks), Last updated May 19, 2020, 4 pgs.

Blondel et al., "Fast unfolding of communities in large networks", arXiv:0803.0476 [physics.soc-ph], Jul. 25, 2008, 12 pgs.

Jaccard, "The Distribution of the Flora in the Alpine Zone", The New Phytologist, Feb. 29, 1912, vol. XI, No. 2, pp. 37-50.

Jacomy et al., "ForceAtlas2, a Continuous Graph Layout Algorithm for Handy Network Visualization Designed for the Gephi Software", PLOS One, vol. 9, No. 6, Jun. 10, 2014, Retrieved from: ForceAtlas2, a Continuous Graph Layout Algorithm for Handy Network Visualization Designed for the Gephi Software, 12 pgs.

Van Dongen, "Graph Clustering by Flow Simulation", Thesis, Center for Math and Computer Science (CWI), 2000, 173 pgs (Presented in Two Parts).

* cited by examiner

SYSTEMS AND METHODS FOR 3D DATA VISUALIZATION AND NETWORK EXTRACTION

CROSS-REFERENCE TO RELATED APPLICATIONS

The current application claims priority under 35 U.S.C. 119(e) to U.S. Provisional Patent Application Ser. No. 62/965,112, entitled "Systems and Methods for Network Visualization", filed Jan. 23, 2020. The disclosure of U.S. Provisional patent Application Ser. No. 62/965,112 is incorporated herein by reference in its entirety.

FIELD OF THE INVENTION

This invention generally relates to the visualization of data, and to the extraction of network structures from data.

BACKGROUND

Three-dimensional (3D) computer graphics are graphics that use a three-dimensional representation of geometric data stored in memory for the purposes of performing calculations and rendering 2D images. Conventional computer displays are capable of rendering a 2D image that gives the appearance of depth. Recently, Virtual Reality (VR) and Augmented Reality (AR) devices have been developed that simulate depth using stereoscopy, where different viewpoints of the same scene are displayed to the left and right eyes, such as the Vive, by HTC, or the Oculus Rift, by Oculus VR.

Data visualization using computer systems involves displaying data as a graphical representation of the data and is an important tool for data analysis. 3D computer graphic techniques have recently been used to try and represent large data sets in ways that are understandable by human users. Virtual reality has begun to be used to present 3D data to users.

Network Graphs (sometimes simply referred to as "networks" or "graphs") are a way of representing things and the relationships that exist between them. Networks are made of nodes and edges. Nodes can represent things from tangible objects to abstract ideas. Edges represent the relationships between nodes. Edges can have a weight which represent the strength of the relationship between the two nodes the edge connects.

SUMMARY OF THE INVENTION

Systems and methods for data visualization and network extraction in accordance with embodiments of the invention are illustrated. One embodiment includes a data visualization system including at least one processor, and a memory, the memory containing a data visualization application, where the data visualization application directs the at least one processor to obtain a graph comprising a plurality of nodes and a plurality of edges, identify a plurality of communities in the graph, where each community includes of nodes from the plurality of nodes, generate a community graph structure based on the identified communities, where the community graph includes a plurality of supernodes and a plurality of superedges, where each supernode in the plurality of supernodes represents nodes in the plurality of nodes being part of the same community, and where each superedge in the plurality of superedges connects two supernodes, and represents edges in the plurality of edges connecting nodes represented by the two supernodes, spatialize the community graph structure, unpack the spatialized community graph structure into an unpacked graph structure comprising the plurality of nodes and the plurality of edges, where each node in the plurality of nodes is located at approximately the position of the supernode that represented it, spatialize the unpacked graph structure, and provide the spatialized unpacked graph structure.

In another embodiment, the system further include a display; and wherein the data visualization application further directs the at least one processor to provide the spatialized unpacked graph structure via the display.

In a further embodiment, to identify communities in the graph, the data visualization application further directs the at least one processor to generate a plurality of community labels via application of Markov Clustering, where each node in the plurality of nodes is assigned a label from the plurality of community labels, and refine the assignment of community labels via Louvain Modularity.

In still another embodiment, the at least one processor includes at least one graphics processing unit (GPU) having a GPU memory, wherein a pruning threshold for the Markov Clustering is equal to the lesser of the number of nodes in the plurality of nodes and a size of the GPU memory$\times 10^6/50\times$ the number of nodes in the plurality of nodes.

In a still further embodiment, the Markov Clustering is applied for between 3 and 15 iterations.

In yet another embodiment, wherein the data visualization application further directs the at least one processor to approximate a centrality metric for each given community node in the spatialized unpacked graph structure by further directing the at least one processor to randomly sample a portion of the plurality of nodes without replacement, compute graph distance from each sampled node to each given community node in the spatialized unpacked graph structure, randomly resample the remaining portion of the plurality of nodes without replacement and computing graph distance until a minimum sampling threshold is met and a processing time threshold is met, and approximate at least one centrality metric for each node in the plurality of nodes based on the computed graph distances.

In a yet further embodiment, the minimum sampling threshold is 1024 nodes; and wherein the processing time threshold is 10 seconds.

In another additional embodiment, to obtain the graph, the data visualization application further directs the at least one processor to obtain a tabular data structure having a plurality of rows and a plurality of columns, and convert the tabular data structure into a graph structure.

In a further additional embodiment, to convert the tabular data structure into a graph structure, the data visualization application directs the at least one processor to identify a node column from the plurality of columns, identify a plurality of associative columns from the plurality of columns, generate a set of nodes based on values in the node column, where each node in the set of nodes represents a value in the node column without duplication, construct a reverse index of the tabular data structure, where the reverse index includes a set of key-value pairs, a key in a given key-value pair is a given value from the plurality of associative columns without duplication, and a value in the given key-value pair is a list of values from the node column that appear on the same row as the given value from the plurality of associative columns without duplication, construct a set of edges based on the reverse index, where each edge in the set of edges is constructed by connecting every combination of node values in the value of each key-value pair, construct an edgelist from the set of edges, where the edgelist includes a list of every edge in the set of edges, replace edges in the edgelist having identical endpoints with a single edge, where a weight of the replacement edge is equal to the sum of edge weights of the replaced edges, and construct a graph structure using edges in the edgelist to connect nodes in the set of nodes.

In another embodiment again, the data visualization application directs the at least one processor to prune the reverse index by removing key-value pairs having a length of the value greater than 10% of the size of the set of nodes.

In a further embodiment again, the data visualization application directs the at least one processor to prune the edgelist by removing a percentage of edges having the lowest edge weight.

In still yet another embodiment, a data visualization method includes obtaining a graph comprising a plurality of nodes and a plurality of edges, identifying a plurality of communities in the graph, where each community includes nodes from the plurality of nodes, generating a community graph structure based on the identified communities, where the community graph includes a plurality of supernodes and a plurality of superedges, where each supernode in the plurality of supernodes represents nodes in the plurality of nodes being part of the same community, and where each superedge in the plurality of superedges connects two supernodes, and represents edges in the plurality of edges connecting nodes represented by the two supernodes, spatializing the community graph structure, unpacking the spatialized community graph structure into an unpacked graph structure comprising the plurality of nodes and the plurality of edges, where each node in the plurality of nodes is located at approximately the position of the supernode that represented it, spatializing the unpacked graph structure, and providing the spatialized unpacked graph structure.

In a still yet further embodiment, the method further includes providing the spatialized unpacked graph structure via a display.

In still another additional embodiment, identifying communities in the graph includes generating a plurality of community labels via application of Markov Clustering, where each node in the plurality of nodes is assigned a label from the plurality of community labels, and refining the assignment of community labels via Louvain Modularity.

In a still further additional embodiment, a pruning threshold for the Markov Clustering is equal to the lesser of the number of nodes in the plurality of nodes and a size of a GPU memory×$10^6$/50×the number of nodes in the plurality of nodes.

In still another embodiment again, the Markov Clustering is applied for between 3 and 15 iterations.

In a still further embodiment again, the method further includes approximating a centrality metric for each given community node in the spatialized unpacked graph structure by randomly sampling a portion of the plurality of nodes without replacement, computing graph distance from each sampled node to each given community node in the spatialized unpacked graph structure, randomly resampling the remaining portion of the plurality of nodes without replacement and computing graph distance until a minimum sampling threshold is met and a processing time threshold is met, and approximating at least one centrality metric for each node in the plurality of nodes based on the computed graph distances.

In yet another additional embodiment, the minimum sampling threshold is 1024 nodes; and wherein the processing time threshold is 10 seconds.

In a yet further additional embodiment, obtaining the graph includes obtaining a tabular data structure having a plurality of rows and a plurality of columns, and converting the tabular data structure into a graph structure.

In yet another embodiment again, converting the tabular data structure into a graph structure includes, identifying a node column from the plurality of columns, identifying a plurality of associative columns from the plurality of columns, generating a set of nodes based on values in the node column, where each node in the set of nodes represents a value in the node column without duplication, constructing a reverse index of the tabular data structure, where the reverse index includes a set of key-value pairs, a key in a given key-value pair is a given value from the plurality of associative columns without duplication, and a value in the given key-value pair is a list of values from the node column that appear on the same row as the given value from the plurality of associative columns without duplication, constructing a set of edges based on the reverse index, where each edge in the set of edges is constructed by connecting every combination of node values in the value of each key-value pair, constructing an edgelist from the set of edges, where the edgelist includes a list of every edge in the set of edges, replacing edges in the edgelist having identical endpoints with a single edge, where a weight of the replacement edge is equal to the sum of edge weights of the replaced edges, and constructing a graph structure using edges in the edgelist to connect nodes in the set of nodes.

In a yet further embodiment again, the method further includes pruning the reverse index by removing key-value pairs having a length of the value greater than 10% of the size of the set of nodes.

In another additional embodiment again, the method further includes prune the edgelist by removing a percentage of edges having the lowest edge weight.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

Figure 1:
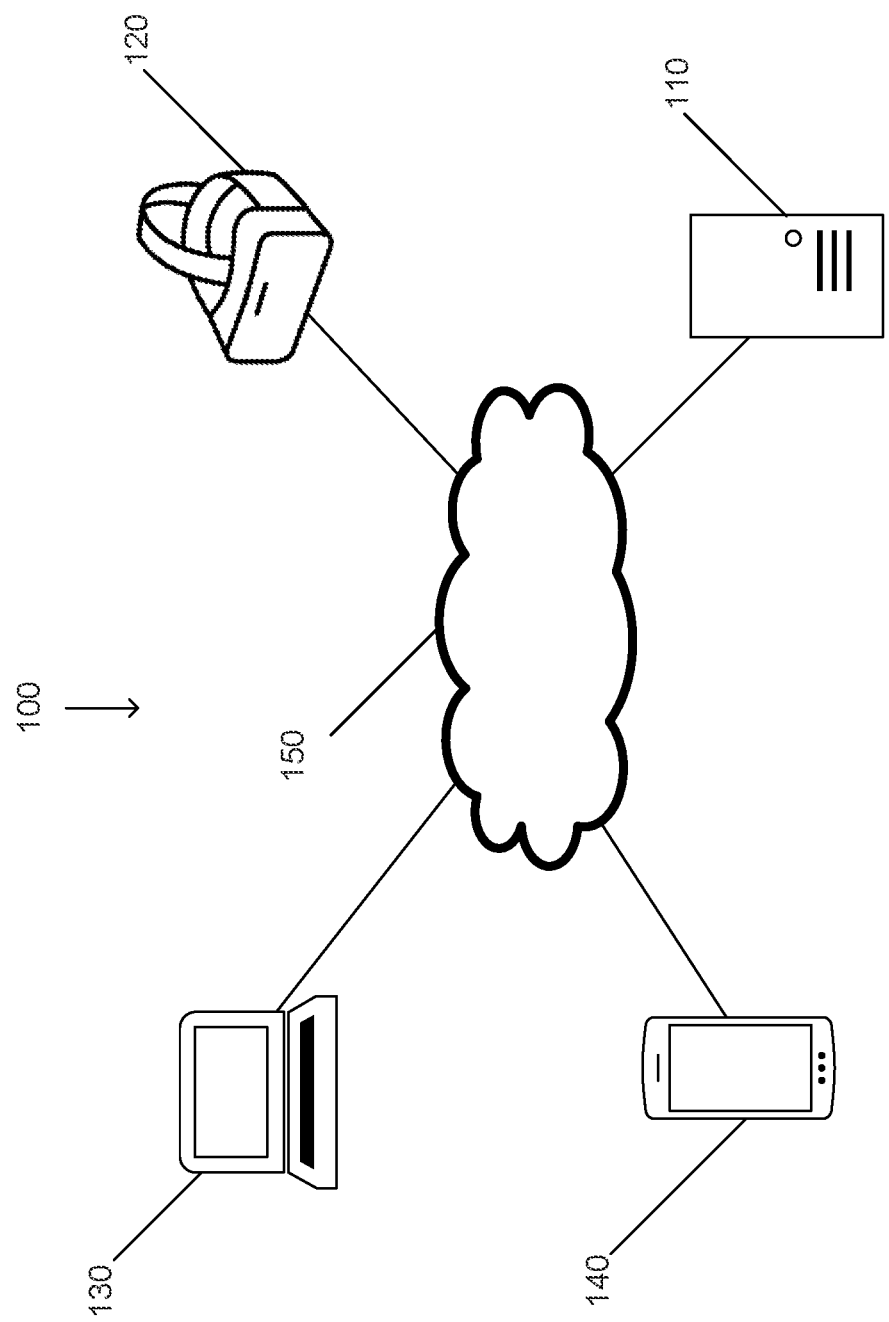
FIG. 1 is a network diagram for a data visualization system in accordance with an embodiment of the invention.

DETAILED DESCRIPTION 3D data visualization systems are built to enable users to understand their data in intuitive, visual ways. By interacting with data visually, the human mind is capable of using its significant pattern recognition abilities to make sense of data. However, 3D rendering, and especially rendering images for Virtual Reality (VR), Augmented Reality (AR), and Mixed Reality (MR) systems takes a significant amount of computing power. In the age of Big Data, data sets that are increasingly large and complex are becoming both invaluable and readily available. However, as the complexity and volume of a dataset increases, so too does the processing power required to visualize the data.

This issue presents multiple challenges for the effective usage and visualization of data, many of which are discussed in U.S. Pat. No. 10,621,762, entitled "Systems and Methods for High Dimensional 3D Data Visualization", granted Apr. 14, 2020, the entirety of which is hereby incorporated by reference. One challenge is how to spatially represent data in a 3D virtual space. Many conventional methodologies for spatializing data such as ForceAtlas2 are designed for scale-free networks up to approximately 10,000 nodes before significant lag is introduced, and/or for use in 2 dimensions. As can be readily appreciated, proper spatialization in 3-dimensional space is desirable, as well as the ability to efficiently compute node locations for million+ node datasets. However, with the addition of another dimension, as well as operation on high cardinality data sets, compute power can be a considerable problem.

In order to enable 3D spatialization on high cardinality data sets, systems and methods described herein can utilize high efficiency data structures and processing methodologies to produce results in near real-time. In many embodiments, both Markov clustering and Louvain modularity can be used in series to rapidly cluster nodes into a smaller set of supernodes. Supernodes can be spatialized to get an approximate starting position for the constituent nodes. The supernodes can then be unpacked into their constituent nodes which in turn can be spatialized. This can significantly increase computational efficiency as each node in the graph can be initially placed close to where it will eventually end up. The spatialization methodologies and data structures introduced herein can further provide speed increases by parallelizing the computational process, and by estimating an appropriate halting point for the spatialization process itself.

While visualization of data as a graph can be itself useful to a viewer, systems and methods described herein can enable additional analysis tools that can operate on large graph structures to provide insight into the data. In numerous embodiments, a network extractor tool is provided which is able to identify networks in a data set and restructure a graph to a network form. Network analysis functionality can be provided as well as graph analysis functionality. Data visualization systems are described in further detail below.

Data Visualization Systems

Data visualization systems can be implemented using a variety of architectures, from single computing devices to distributed computing systems. In numerous embodiments, multiple user interface devices can be connected to enable multiple users to interact with the data and with each other in a virtual environment. In many embodiments, the distribution of computational activity is dependent upon the number of users interacting with the visualization.

A data visualization system in accordance with an embodiment of the invention is illustrated in FIG. 1. Data visualization system 100 includes a data visualizer 110. Data visualizers can be implemented using a variety of different hardware. For example, personal computers, servers, server systems (e.g. cloud computing architectures), could be used as a Data visualizer. In numerous embodiments, Data visualizers can leverage distributed computer hardware. Data visualizers can perform data visualization processes including, but not limited to, those discussed in below sections.

Data visualization system 100 further includes a number of user interface devices, such as a VR display 120, a computer terminal 130, and smartphone 140. Example VR displays can be, but are not limited to, VR headsets such as the Oculus Rift, HTC Vive, or the Google Cardboard, AR displays such as the Microsoft Hololens, and/or MR displays such as Windows Mixed Reality Headsets. In many embodiments, user interface devices include a display capable of rendering high dimensional data in accordance with data visualization processes. In a variety of embodiments, user interface devices enable users to set visualization parameters, manipulate the view point of the visualization, and/or access generated insights. Data visualization systems can provide different viewpoints of the same visualization to each connected user interface device, and/or provide the same viewpoint to two or more user interface devices.

Data visualizer 100 is connected to interface devices via a network 150. Network 150 can be a wired network, a wireless network, or a combination of both wired and wireless networks. In many embodiments, networks include (but are not limited to) wide area networks, local area networks, personal area networks, the Internet, or any other communication protocol and/or network architecture as appropriate to the requirements of specific applications of embodiments of the invention.

As can be readily appreciated, and number of architectures can be used, such as, but not limited to, architectures that involved distributed computing platforms, different numbers of user interface devices, and/or any other implementation that may be appropriate to the requirements of a given application. Data visualizers are discussed in further detail below.

Data Visualizers

As noted above, data visualizers are capable of performing data visualization processes. While below is a discussion of an exemplary data visualization system implemented using a single computing device, in numerous embodiments, Data visualizers are implemented using distributed architectures. The specific architecture can change based on the processing power required and the number of users that are designed to interact with the system.

Figure 2:
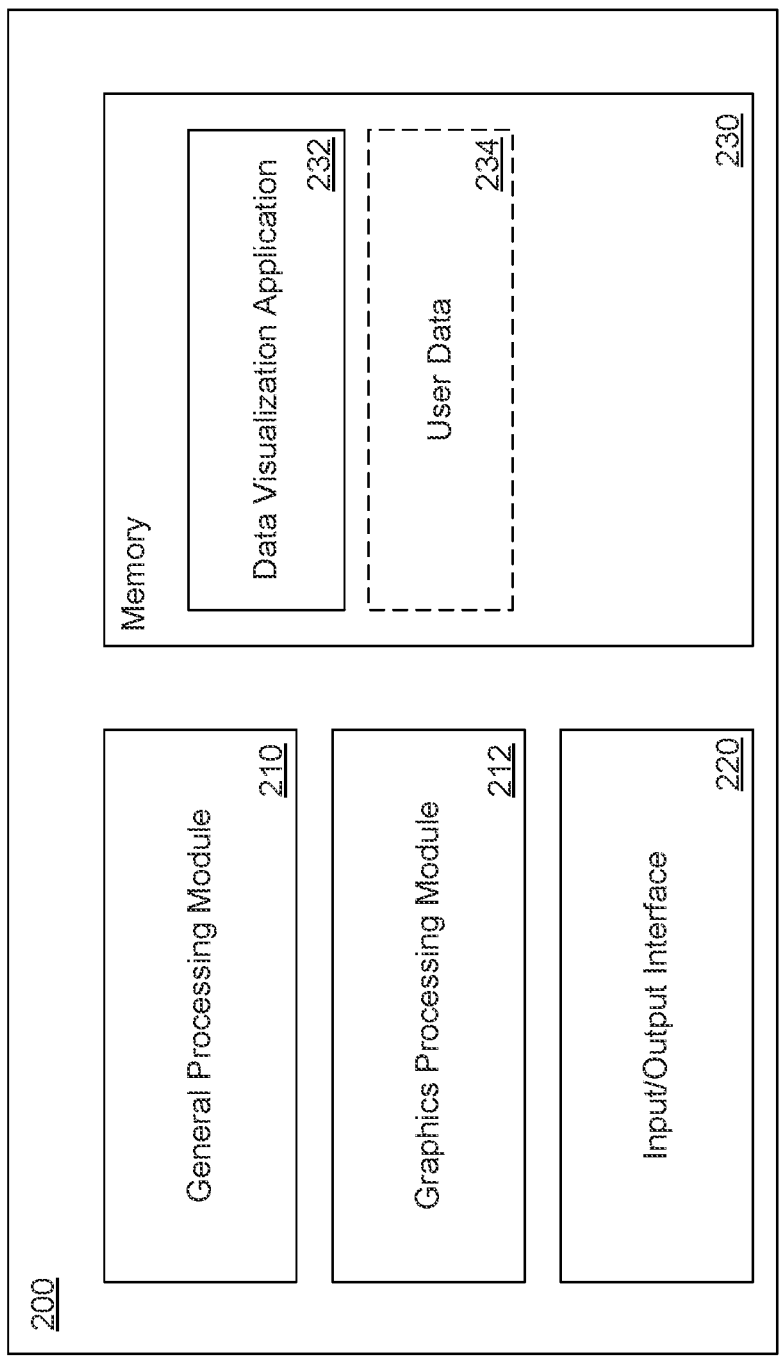
FIG. 2 conceptually illustrates a data visualization system implemented on a single computing device in accordance with an embodiment of the invention.

A data visualizer implemented on a single computing device in accordance with an embodiment of the invention is illustrated in FIG. 2. Data visualizer 200 includes a generic processing module 210 and a graphics processing module 212. In numerous embodiments, generic processing modules are general purpose processors such as a Central Processing Unit (CPU). Graphics processing modules are processors architected to excel at numerous, parallelizable functions such as rendering images including, but not limited to, GPUs. In some embodiments, generic processing module 210 and graphics processing module 212 can be implemented using the same processing circuitry and/or using more than two processing components. As can readily be appreciated, Data visualizers can take advantage of the capabilities of different processor configurations to optimize computational resources.

Data visualizer 200 includes an input/output (I/O) interface 220. I/O interface can connect to user interface devices such as a VR headset, or a 2D display. In numerous embodiments, displays can be completely integrated into the data visualizer. In many embodiments I/O interfaces enable communications with distributed computing hardware, the acquisition of user data to visualize, and/or obtaining visualization parameters. As can be readily appreciated, any number of I/O circuitries can be used, including multiple types of I/O interfaces that are specialized for communication with different types of devices.

Data visualizer 200 further includes a memory 230. Memory 230 can be any type of memory, such as (but not limited to) volatile memory, non-volatile memory, or any combination thereof. Memory 230 contains a data visualization application 232. Data visualization applications can configure generic processing modules and graphics processing modules to perform data visualization processes. In many embodiments, data visualization applications can determine what hardware is available, and optimize performance of the data visualization application by utilizing specialized data structures that can take advantage of different hardware. Memory 230 can further include user date 234 acquired from a user interface device. As can be readily appreciated, additional memory can be incorporated into the system. For example, in various embodiments, the GPU may have dedicated memory separate from memory 230 such as (but not limited to) video random access memory (VRAM). In some embodiments, the GPU may have a dedicated portion of memory 230.

As can readily be appreciated, any number of system designs can be used to enable a computer system to perform a data visualization processes. For example, in numerous embodiments, Data visualizers may include multiple generic processing modules and/or graphics processing modules. Data visualization processes for spatializing data are described in further detail below.

Data Spatialization

Rendering large datasets is a technical challenge in and of itself. However, where to spatially render the data presents yet a further technical challenge. When visualizing data for human consumption, it can be desirable to not merely map points to particular coordinates extracted exactly from the data point's values. For example, if a data point represents three values "age," "height," and "weight," but the dataset as a whole contains many ages and weights that are close or the same in value, visualizing the data may result in a confusing cluster of points that is incomprehensible. Points may overlap or be otherwise hidden by their neighbors. As such, in many embodiments, it is desirable to visually render each point near to where they should be such that the overall structure of the dataset is comprehensible. By way of further example, the X, Y, and Z coordinates of a point may not exactly correspond to particular values of that datapoint. This is especially true when the data itself does not contain any values that can be used as a coordinate, e.g. the data contains only relationships between datapoints. Spatialization methods can include running physics simulations on points, where the points are submitted to gravitational, attractive, and repelling forces which can be tuned to get points into a comprehensible structure. Given the nature of such simulations, for each datapoint that is being rendered, computational complexity significantly increases. Systems and methods described herein can automatically generate 3D spatial layouts for large datasets that intuitively present data to human viewers with increased computational efficiency over conventional methods.

In order to increase efficacy, in numerous embodiments, spatialization occurs twice. First, the overall dataset is condensed via community detection into a community graph. In a community graph, each "supernode" represents all nodes belonging to a single community. Similarly, each "superedge" connecting two supernodes represents all edges connecting nodes between the two communities. In many embodiments, the weight of a superedge is the sum of the represented edge weights. Spatialization is performed on the community graph to get the approximate final location for all of the nodes in each community. The supernodes are then unpacked into their constituent nodes placed around the location of the supernode. In a many embodiments, noise is introduced to ensure constituent nodes are not overlapping. The entire unpacked graph containing all nodes is then spatialized again. As all nodes are already in their approximate final locations, spatialization on the unpacked graph is significantly less computationally complex than conventional methodologies where nodes can be randomly placed in 3D space because only a small number of cycles are needed to reach convergence.

Figure 3:
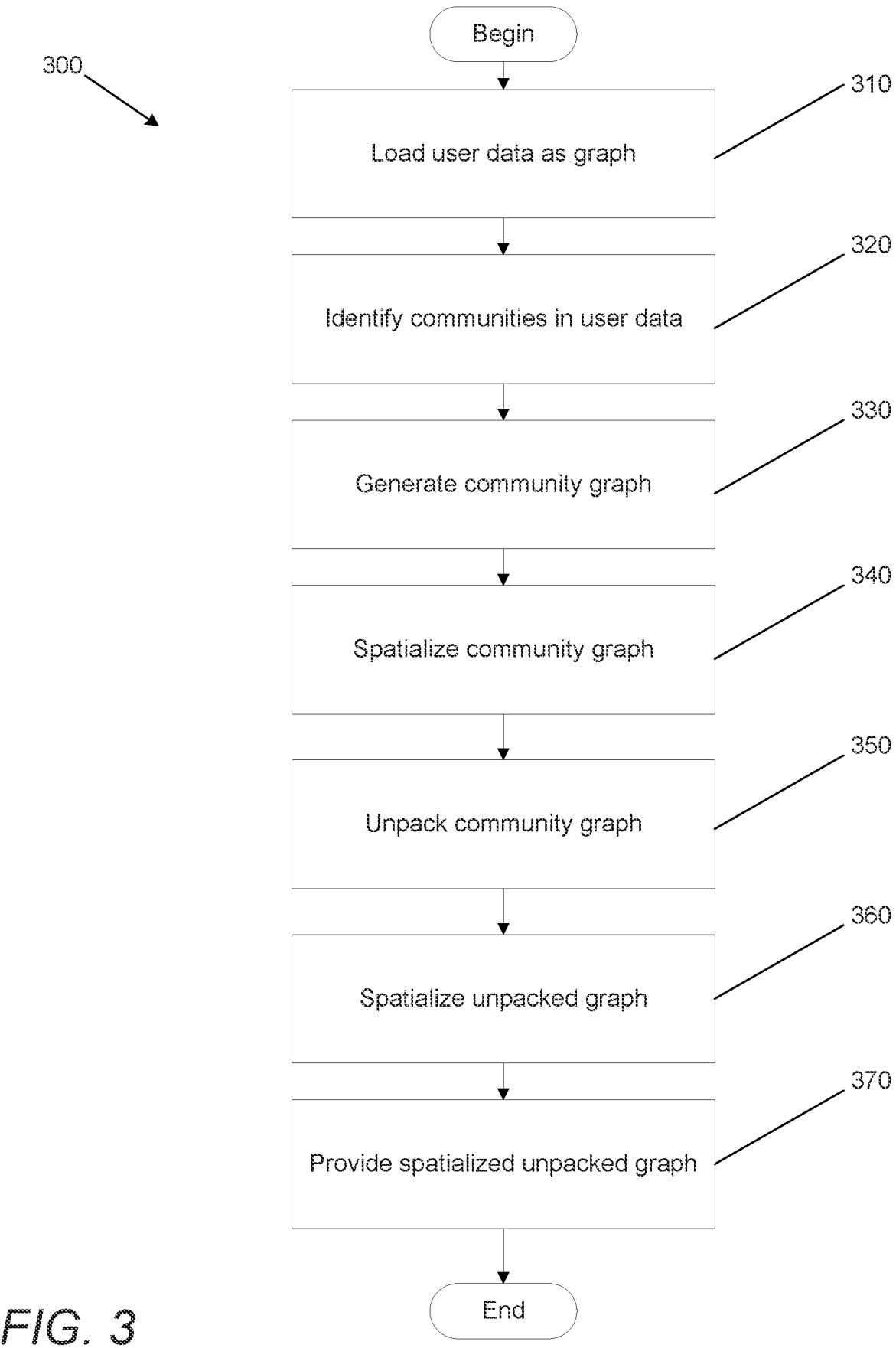
FIG. 3 is a flowchart illustrating a data visualization process for generating a spatial layout for a dataset in accordance with an embodiment of the invention.

In numerous embodiments, the specific method of spatialization itself can be accelerated by using any or a combination of hybrid community detection methods described herein and graphics processing unit (GPU) accelerating data structures described below. Turning now to FIG. 3, a process for generating a 3D spatial layout for a dataset in accordance with an embodiment of the invention is illustrated.

Process 300 includes loading (310) user data. In many embodiments, user data includes numerous records. In many embodiments, each record can be represented as a node. However, in many embodiments, values in records can be represented as nodes. Data can be provided in one or more of any number of formats including (but not limited to) as an edge list, an adjacency matrix, as JavaScript Object Notation (JSON) data, as a table, and/or as any other database format as appropriate to the requirements of specific applications of embodiments of the invention. In various embodiments, the user data is converted into a standardized tabular format. Communities are then detected (320) within the data. In numerous embodiments, communities are detected using a sequential combination of Markov Clustering and Louvain Modularity, which is discussed in further detail below with respect to FIG. 4.

Once communities are detected, a community graph is generated (330). In many embodiments, the community graph contains a set of supernodes and edges, where each supernode represents all nodes in a particular community. The community graph is then spatialized (340). In numerous embodiments, the spatialization process involves applying a force-directed layout algorithm in which each node (or supernode in this case) apply a repulsive force on each other while edges serve as an attractive spring force between pairs of nodes (or supernodes). Further, a gravitational force can be applied to the overall system to maintain a reasonable scale. In numerous embodiments, these three forces (repulsive, attractive, and gravitational) are computed and applied iteratively until the network reaches a stable configuration. In numerous embodiments, stable configurations are identified when net node movement that is directly opposite from the previous iteration is below a threshold value epsilon. In various embodiments, the epsilon value is between 50% and 70%. In many embodiments, the epsilon value is 60%. In other words, if the global swing (the amount of node movement that is directly opposite of the previous iteration's node movement) makes up less than epsilon of movement from the current iteration, the spatialization is halted. This measure can effectively be considered as checking whether more than epsilon of the nodes are merely jittering in place rather than making significant movements. However, as can readily be appreciated, epsilon values can be modified depending on the dataset and as appropriate to the requirements of specific applications of embodiments of the invention. Further, in many embodiments, at least a predetermined number of iterations (e.g. 3-7) are performed before halting is considered as the simulation can begin with a lack of momentum which reduces overall node movement.

The spatialized community graph is unpacked (350) such that each supernode is broken down into its constituent nodes. In various embodiments, random noise is added to each of the three spatial dimensions for each node in the graph to prevent overlapping nodes. In many embodiments, the application of noise further increases stability and leads to faster convergence. In numerous embodiments, the noise applied is between −0.005 and 0.005 to each dimension, although these values can be modified based on the density of the data as appropriate to the requirements of specific applications of embodiments of the invention.

The unpacked graph is then again spatialized (360) using methods similar to those used with respect to the spatialization of the community graph. The resulting spatialized unpacked graph is then provided (370) and can be visualized in a 3D virtual space. In numerous embodiments, each of the 3D coordinates (X,Y,Z) of each node are saved in their own column in the tabular representation of the user data.

Figure 4:
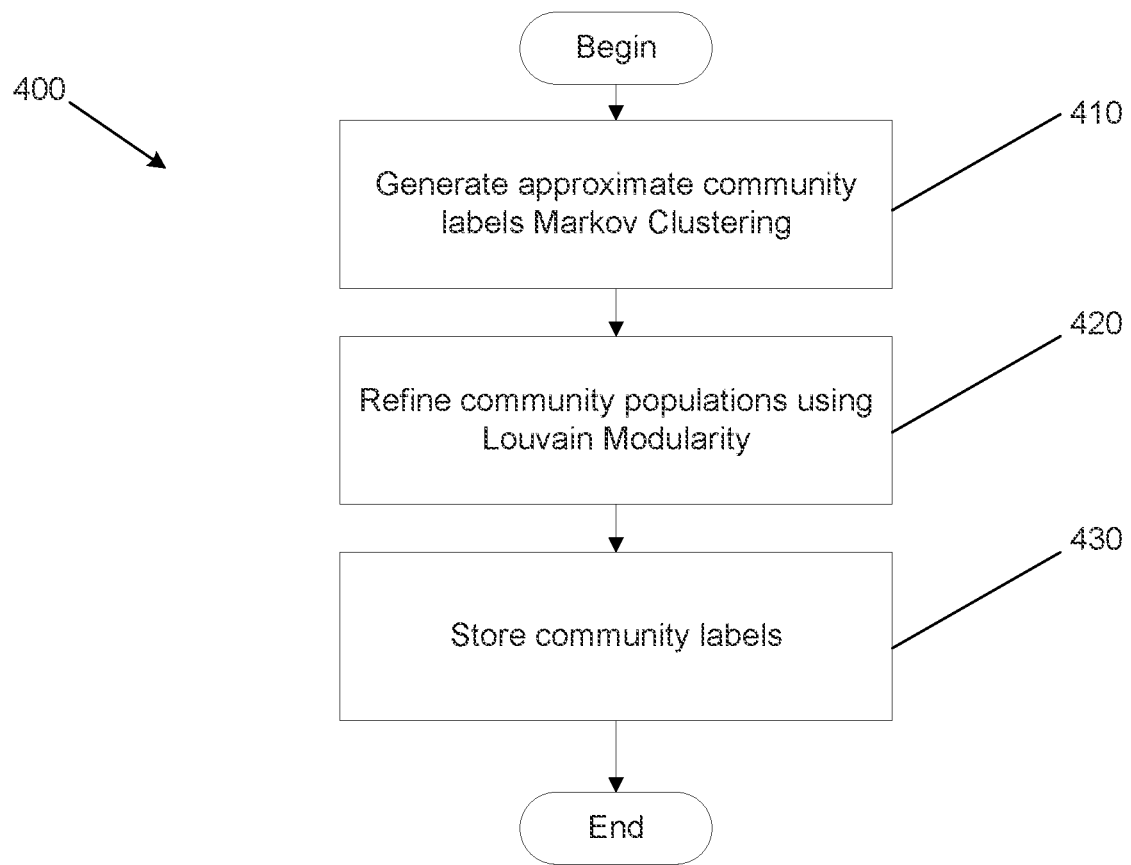
FIG. 4 is a flowchart illustrating a data visualization process for identifying communities in user data in accordance with an embodiment of the invention.

Turning now to FIG. 4, a community detection process in accordance with an embodiment of the invention is illustrated. As noted above, systems and methods described herein can use the sequential application of Markov Clustering and Louvain Modularity to greatly accelerate community detection.

Markov Clustering leverages linear algebra operations to identify communities (or "clusters") of nodes that have a heavy level of interconnectivity. In particular Markov Clustering uses a weighted adjacency matrix representation of the graph data and alternatively multiplies the matrix with itself and subsequently prunes weaker edges from the matrix. After several iterations, the community structures emerge. However, while Markov Clustering quickly reduces the size of the graph (in terms of numbers of communities), it can take a long time to stabilize on final community labels as each iteration has diminishing returns.

Modularity is a metric (between −1 and 1) that measures how well a network has been partitioned into communities. Louvain Modularity is a community detection process that aims to iteratively increase modularity. In general, Louvain Modularity operates by initially placing each node in a unique community and then iteratively moving nodes from their current community to the neighboring community that would create the biggest increase in modularity. This process is a form of hierarchical partitioning which can be slow at reducing the total number of communities but quick in the final steps for determining a final set of community labels. Systems and methods described herein can utilize Markov Clustering to rapidly reduce the number of prospective communities, and then switch to Louvain Modularity to refine the population of each community.

Process 400 includes generating (410) approximate community labels using Markov Clustering. Markov Clustering is defined in Stijn van Dongen, "Graph Clustering by Flow Simulation" PhD thesis, University of Utrecht, May 2000. In many embodiments, the Markov Clustering pruning threshold is influenced by the GPU memory of the Data Visualizer. Specifically, the pruning threshold can be correlated with the size of the graph and the available GPU memory such that the threshold is equal to the lesser of the number of nodes in the graph and $$\frac{GPU \text{ memory size} * 10^6}{50 * \text{number of nodes}}.$$

In many embodiments, Markov Clustering is run for between 3 and 15 iterations depending on the size of the dataset, although in some applications a longer run time can be used as appropriate to the requirements of specific applications of embodiments of the invention. In many embodiments, 5 iterations are run.

Process 400 further includes refining the community population labels using Louvain Modularity. Louvain Modularity is defined in Blondel et al., "Fast unfolding of communities in large networks". Journal of Statistical Mechanics: Theory and Experiment 2008 (10). The output of the Markov Clustering can be provided to the Louvain Modularity process. Conventionally, in Louvain modularity all nodes begin in their own community. In contrast, in many embodiments, the nodes start in communities as determined by the output of the Markov Clustering. The Louvain Modularity process sorts the nodes into their correct labels, and in some cases may reduce the total number of labels. Depending on the data, it is possible to yield a single large cluster, or as many clusters as there are nodes (i.e. complete separation between all data points). The label for each node is then stored (430) in the tabular data structure for later use. In some cases where the total number of nodes is very small, it is possible to skip the application of Markov Clustering. In various embodiments, when the number of nodes is less than 20,000, Markov Clustering can be skipped due to negligible returns.

Using the above, it is possible to rapidly generate spatializations in near real time for extremely large datasets on the order of 100,000s to millions and more depending on available compute. Data Visualizers can further provide analysis of the structure and underlying data via additional visualization processes. Additional tools are discussed in further detail below.

Visualization Analysis

Visualized graphs can be made even more useful by applying insightful highlights and/or by providing additional description of the data. Many graph analysis metrics and values can be visualized as well. For example, community leader nodes (e.g. those nodes that share an edge with at least 20%+ of nodes in its community, or in some cases, the most connected node within a community) can be highlighted. Further, largest and smallest communities can be highlighted, as well as the most influential community. In various embodiments, the most influential community can be determined by computing PageRank on the community graph. In various embodiments, the clustering coefficient for the graph can be computed, and the community with the highest median clustering coefficient can be highlighted.

Of increased complexity is determining the most central community and most isolated community in a graph. Both centrality and isolation can be determined by measuring graph distance metrics. In many embodiments, the most central community is determined by the average of betweenness and closeness centrality metrics, referred to as the overall centrality measure. The overall highest centrality measure indicates the most central community. In contrast, the most isolated community can be determined by identifying the community with the lowest median closeness centrality. All of these centrality metrics are based on shortest path analysis. In many embodiments, Dijkstra's algorithm is relied upon as the basis for determining path length. However, computing Dijkstra's algorithm on a large graph is extremely computationally intensive.

Figure 5:
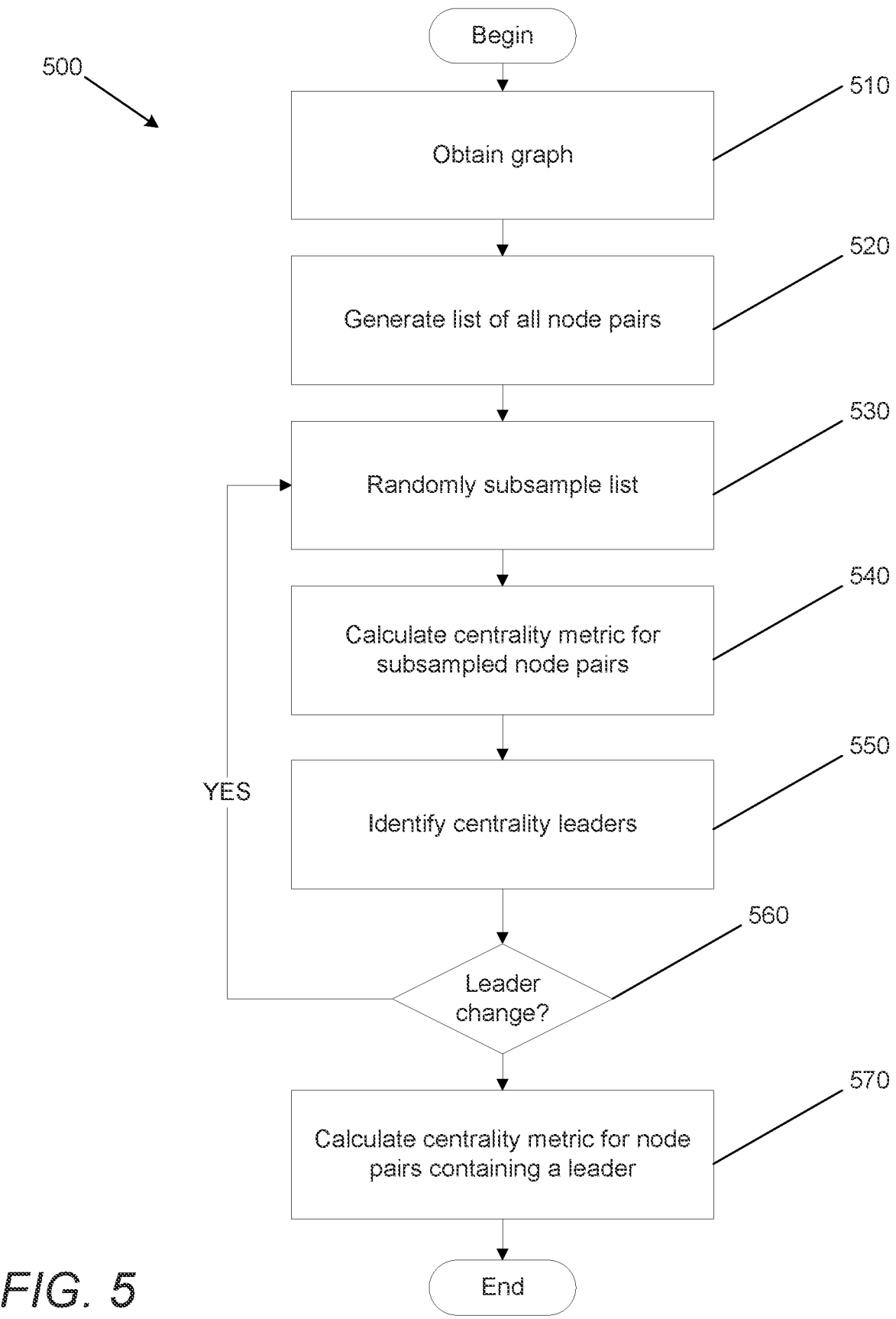
FIG. 5 is a flowchart illustrating a data visualization process for measuring graph distance in accordance with an embodiment of the invention.

Turning now to FIG. 5, a process for rapidly approximating centrality in accordance with an embodiment of the invention is illustrated. Process 500 includes obtaining (510) a graph, and generating a list of all node pairs (520). This list is n(n−1) in size. The list of node pairs is randomly subsampled (530). In many embodiments, 1% of the list is subsampled, although this metric can vary without departing from the scope or spirit of the invention. Centrality is calculated (540) for each of the subsampled node pairs. Centrality leaders are identified (540) amongst the subsampled node pairs. IN various embodiments, 10 leaders are identified. In some embodiments, the number of leaders identified is dependent upon the total number of nodes, the difference between a more central node and the next more central node, and/or any other method as appropriate to the requirements of specific applications of embodiments of the invention.

If the leaders in the current subsampling iteration have changed (560) from the last iteration, then the list is re-subsampled and the process continues. If the leaders do not change (560), then centrality metrics for node pairs containing a leader are calculated. In this way, centrality for all nodes can be approximated with a high degree of certainty. Put another way, this process can be thought of as identifying highways, and then calculating the distance from driveways to on-ramps.

Figure 6:
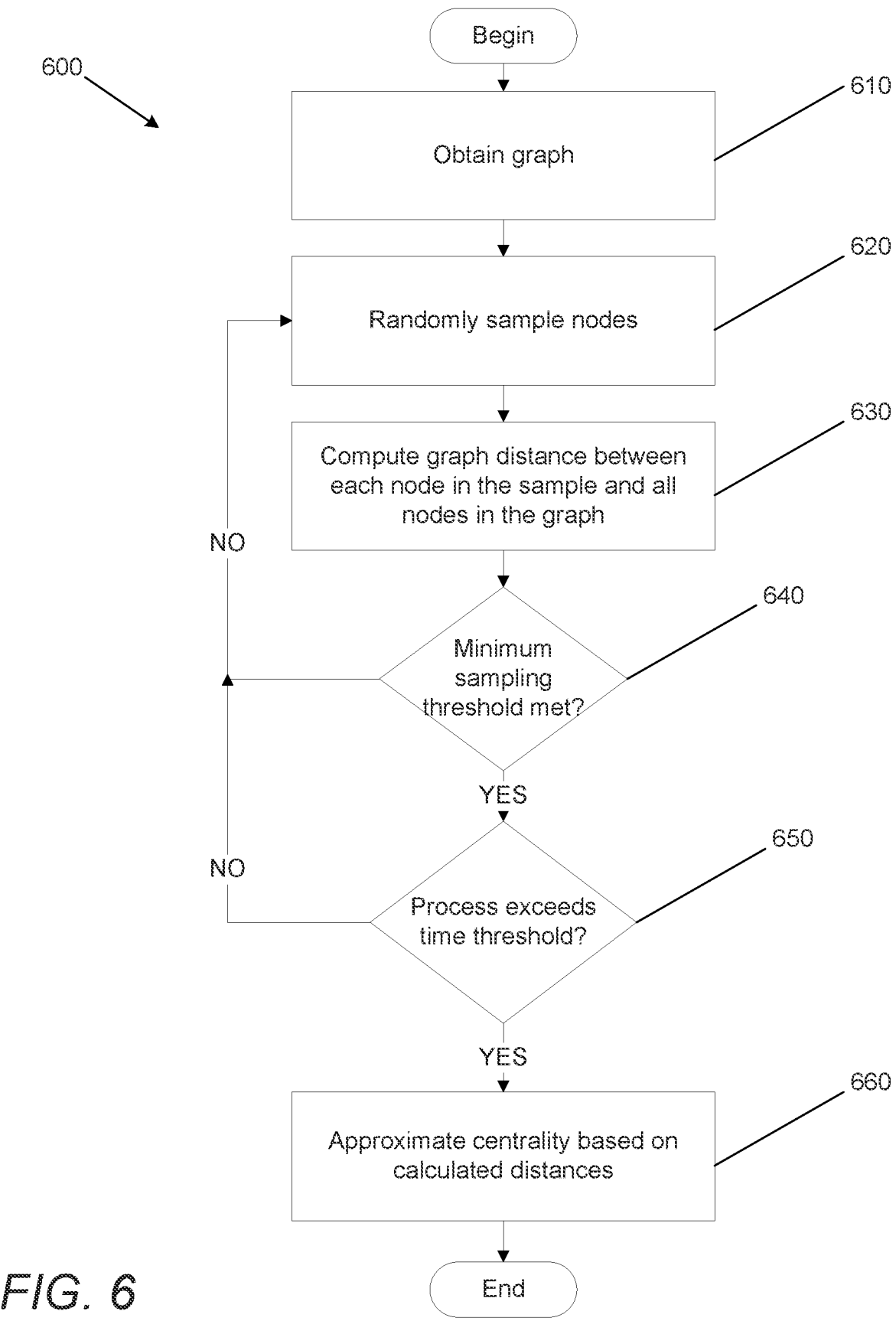
FIG. 6 is a flowchart illustrating another data visualization process for measuring graph distance in accordance with an embodiment of the invention.

In many embodiments, centrality can be approximated while strictly enforcing a time limit on calculations. Turning now to FIG. 6, an alternate process for rapidly approximating centrality in accordance with an embodiment of the invention is illustrated. Process 600 includes obtaining (610) a graph. Nodes are randomly sampled without replacement (620). In many embodiments, the number of nodes in the sample is based on GPU memory size. In various embodiments, the number of nodes in the sample is the maximum number of nodes capable of being stored by the GPU memory.

For each given node in the sample, distance from the given node to all other nodes in the graph is computed (630). In many embodiments, this process can be parallelized, e.g. by virtue of running on one or more GPUs. If fewer than a minimum sampling threshold number of nodes has been sampled (640), then a new random subsample without replacement is taken. Else, if at least the minimum sampling threshold has been met (640) (or if there are fewer nodes than the minimum sampling threshold), then if the process has been running (650) for less than a time threshold, the resampling without replacement occurs again. If both the minimum sampling threshold has been met (640) (or there are fewer nodes than the minimum sampling threshold) and the process has been running for longer than the time threshold (650), the sampling portion of the process ends. In many embodiments, the minimum sampling threshold is 1024 nodes. In various embodiments, the time threshold is 10 seconds. However, as can be readily appreciated, these numbers are arbitrary and can be increased to yield more accurate results at the cost of computational cost and speed, or conversely decreased with the opposite effect.

Once a number of distances has been calculated and sampling is complete, centrality can be approximated (660) for all nodes based on the calculated distances. In many embodiments, different centrality metrics can be approximated. For example, Betweenness centrality is a measurement, for each node, determined by the number of times a node falls along the shortest path between two other nodes based on the shortest path computations between all pairs of nodes in the graph. Betweenness centrality can be approximated for each node by determining the number of times the node falls along the shortest path between two other nodes based on the sample of shortest paths computed in the previous steps. After the betweenness centrality value is computed for all nodes, the values can be normalized such that the max value is 1 and the min value is 0.

By way of further example, closeness centrality is a measurement, for each node, determined by the reciprocal sum of shortest path distances to all other nodes in the graph. Closeness centrality can be approximated for each node by determining the reciprocal sum of shortest path distances that have been computed in the previous steps. After the closeness centrality value is computed for all nodes, the values can be normalized such that the max value is 1 and the min value is 0.

Additionally, Eccentricity is a centrality metric for each node determined by the largest shortest-path between the given node and all other nodes. Eccentricity can be approximated for each node by determining the largest shortest-path between the given node and all nodes for which we have values calculated.

Graphs themselves may not be immediately presented in data obtained by data visualizers. Because graphs and network structures are helpful in understanding data, it can be equally helpful to be able to identify networks within obtained data. Methods for extracting network structures from tabular data are discussed in further detail below.

Network Extraction

Networks exist within many if not all datasets. Indeed, many datasets are generated by output from what are essentially network systems. Even data not output by network systems can be represented in graph form. That said, many datasets are stored in tabular format which does not strictly define a network structure as a set of nodes and edges. Systems and methods described herein can automatically extract a graph structure from a tabular dataset which can in turn be visualized using methods described above. Expanding on the concept of a bipartite graph, N-partite graphs (where "N" represents the number of distinct sets of nodes") are described below as well as methods for identifying them from tabular data structures.

Figure 7:
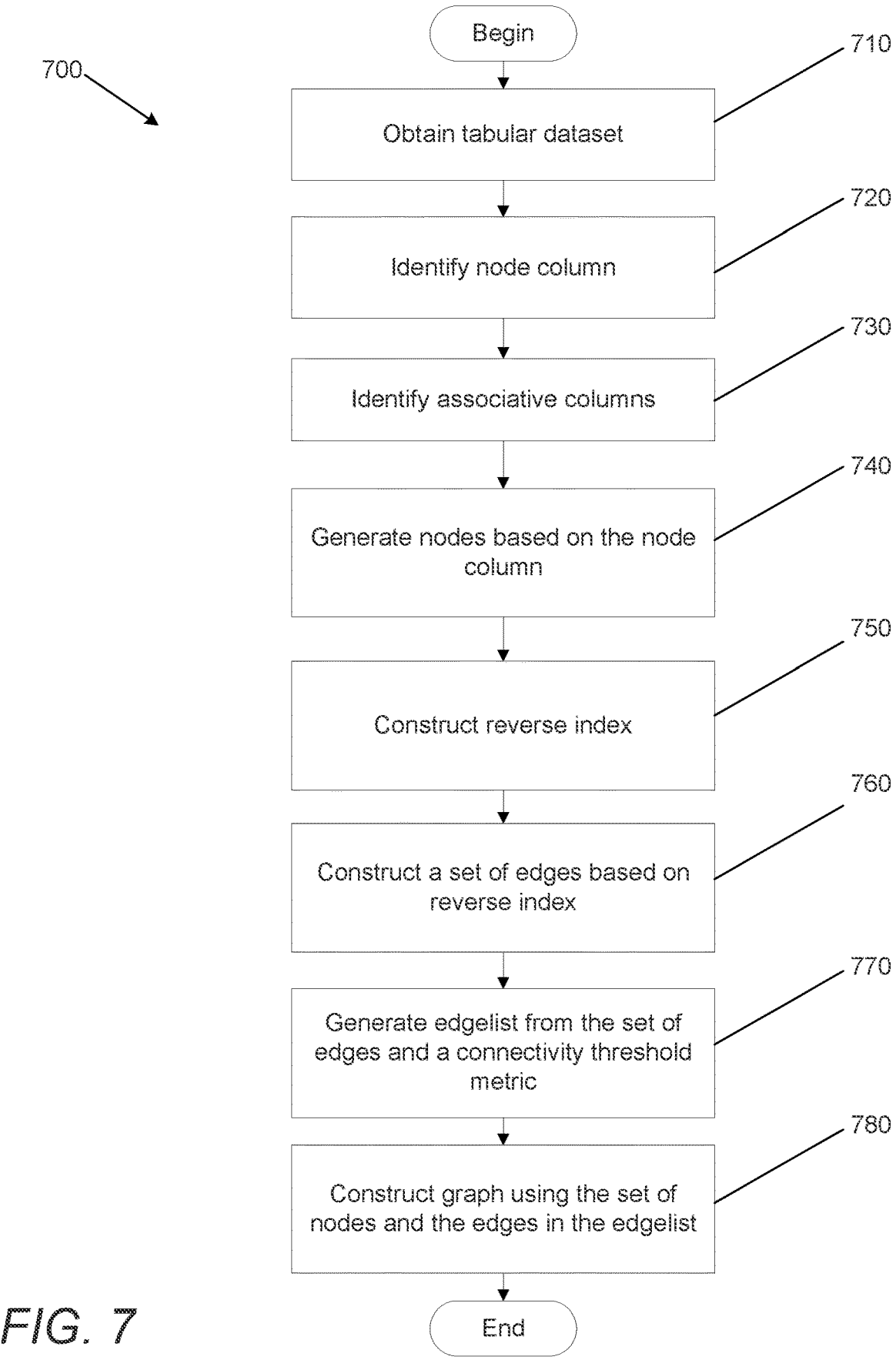
FIG. 7 is a flowchart illustrating a data visualization process for extracting a network structure from a tabular data structure in accordance with an embodiment of the invention.

Turning now to FIG. 7, a process for extracting an N-partite network graph in accordance with an embodiment of the invention is illustrated. Process 700 includes obtaining (710) a tabular dataset (i.e. having rows and columns, where each row is a record and each column defines a variable for which each record have individual values. Columns can also be referred to as "data dimensions" or "dimensions." Variables can be categorical or numerical.

From the columns, a "node column" is identified (720). The node column is treated as the source of nodes and indexed for unique values. In many embodiments, a user can manually select the node column, although in various embodiments node columns can be automatically selected. "Associative columns" are identified (730) from the remaining columns. In many embodiments, the associative columns are manually selected although in numerous embodiments they can be automatically selected. In some embodiments, all categorical columns are selected as associative columns. For each associative value, a set of nodes are generated (740) based on the node column. In many embodiments, the list of values present in the node column is deduplicated, and a node is generated for each value in the deduplicated list of node values.

A reverse index is constructed (750) based on the values in the associative columns. In numerous embodiments, a deduplicated list is constructed containing every value present in the associative columns (i.e. each value in the list appears one time regardless of the number of times that value is present in a given associative column). In numerous embodiments, values in the list are associated with information as to which column they originated from, e.g. via string concatenation with the value and column name, using tuples, using pointers, and/or any other reference method as appropriate to the requirements of specific applications of embodiments of the invention. In this way, a value which appears identically within two different associative columns will appear twice in the deduplicated list of associative values as they will not be treated as equivalent.

A reverse index of the tabular dataset can be constructed from the deduplicated list of associative values. In many embodiments, the reverse index has a key-value structure such as (but not limited to) a dictionary, a hashmap, and/or any other key-value storage structure as appropriate to the requirements of specific applications of embodiments of the invention. In various embodiments, the keys in the reverse index are elements in the deduplicated list of associative values, and the values in the reverse index are a separate deduplicated list of node values that occur on the same rows as the key associative value. The reverse index can be populated by iterating through the tabular data structure. In a variety of embodiments, if the size of the value from the key-value pair (i.e. the length of the list) exceeds a pruning threshold, that key-value pair is deleted from the reverse index. In many embodiments, the pruning threshold is between 5% and 25%. In various embodiments, the pruning threshold is 10%. By pruning the reverse index, excessively common associative values will not be used to generate edges for the graph, thereby reducing computational complexity as well as increasing comprehensibility of the resulting network.

A set of edges is constructed (760) from the reverse index. For each value (i.e. list of node values) in each remaining key-value pair, an edge is constructed for every combination of node values in the list. The weight for each edge is inversely correlated with the size of the deduplicated list of nodes from the key-value pair. That is, if the length of the list is small, and therefore that shared associative value is rarer, then the resulting edge weight is larger.

An edgelist can then be constructed (770) from the set of edges. The edgelist can be initially constructed by listing every edge. For each edge in the edgelist connecting the same two nodes, a new edge is formed to replace the duplicate edges having a weight equal to the sum of the weights of the duplicate edges. In many embodiments, the edgelist can be pruned using a threshold connectivity metric. The top X % (X being the target connectivity threshold metric) can be selected for final inclusion in the graph structure. For example, if the number of nodes is greater than 1000, the target connectivity threshold can be set to 1%, otherwise it is set to 5%. As can be readily appreciated, the target connectivity threshold can be made variable e.g. based on user preference as appropriate to the requirements of specific applications of embodiments of the invention.

A graph structure is then generated (780) by connecting nodes in the set of nodes using edges in the pruned edgelist. In many embodiments, the graph structure in turn is visualizing using methods similar to those described above. As can be readily appreciated, network extraction from tabular data can be performed in many similar ways without departing from the scope or spirit of the invention. For example, pruning criteria may be modified or pruning may not even take place as appropriate to the requirements of specific applications of embodiments of the invention.

Although specific systems and methods for visualizing large datasets as spatialized graphs and network analysis tools are described herein, many different system architectures and visualization methods can be implemented in accordance with many different embodiments of the invention. It is therefore to be understood that the present invention may be practiced in ways other than specifically described, without departing from the scope and spirit of the present invention, for example, by performing steps in the processes in different orders, in parallel, and/or with added, subtracted, and/or substitute steps. Thus, embodiments of the present invention should be considered in all respects as illustrative and not restrictive. Accordingly, the scope of the invention should be determined not by the embodiments illustrated, but by the appended claims and their equivalents.

What is claimed is:

1. A data visualization system comprising:
at least one processor; and
a memory, the memory containing a data visualization application, where the data visualization application directs the at least one processor to:
  obtain a tabular data structure having a plurality of rows and a plurality of columns:
  identify a node column from the plurality of columns;
  identify a plurality of associative columns from the plurality of columns;
  generate a set of nodes based on values in the node column, where each node in the set of nodes represents a value in the node column without duplication;
  construct a reverse index of the tabular data structure, where:
    the reverse index comprises a set of key-value pairs;
    a key in a given key-value pair is a given value from the plurality of associative columns without duplication; and
    a value in the given key-value pair is a list of values from the node column that appear on the same row as the given value from the plurality of associative columns without duplication;
  construct a set of edges based on the reverse index, where each edge in the set of edges is constructed by connecting every combination of node values in the value of each key-value pair;
  construct an edgelist from the set of edges, where the edgelist comprises a list of every edge in the set of edges;
  replace edges in the edgelist having identical endpoints with a single edge, where a weight of the replacement edge is equal to the sum of edge weights of the replaced edges;
  construct a graph comprising a plurality of nodes and a plurality of edges, where the plurality of nodes is constructed using nodes in the set of nodes, and the plurality of edges is constructed using edges in the edgelist to connect nodes in the set of nodes;
  identify a plurality of communities in the graph, where each community comprises nodes from the plurality of nodes;
  generate a community graph structure based on the identified communities;

where the community graph comprises a plurality of supernodes and a plurality of superedges;
where each supernode in the plurality of supernodes represents nodes in the plurality of nodes being part of the same community; and
where each superedge in the plurality of superedges connects two supernodes, and represents edges in the plurality of edges connecting nodes represented by the two supernodes;
spatialize the community graph structure;
unpack the spatialized community graph structure into an unpacked graph structure comprising the plurality of nodes and the plurality of edges, where each node in the plurality of nodes is located at approximately the position of the supernode that represented it;
spatialize the unpacked graph structure; and
provide the spatialized unpacked graph structure.

2. The data visualization system of claim 1, further comprising a display;
and wherein the data visualization application further directs the at least one processor to provide the spatialized unpacked graph structure via the display.

3. The data visualization system of claim 1, wherein to identify communities in the graph, the data visualization application further directs the at least one processor to:
generate a plurality of community labels via application of Markov Clustering, where each node in the plurality of nodes is assigned a label from the plurality of community labels; and
refine the assignment of community labels via Louvain Modularity.

4. The data visualization system of claim 3, wherein the at least one processor comprises at least one graphics processing unit (GPU) having a GPU memory, wherein a pruning threshold for the Markov Clustering is equal to the lesser of the number of nodes in the plurality of nodes and a size of the GPU memory$\times 10^6/50\times$the number of nodes in the plurality of nodes.

5. The data visualization system of claim 3, wherein the Markov Clustering is applied for between 3 and 15 iterations.

6. The data visualization system of claim 1, wherein the data visualization application further directs the at least one processor to approximate a centrality metric for each given community node in the spatialized unpacked graph structure by further directing the at least one processor to:
randomly sample a portion of the plurality of nodes without replacement;
compute graph distance from each sampled node to each given community node in the spatialized unpacked graph structure;
randomly resample the remaining portion of the plurality of nodes without replacement and computing graph distance until a minimum sampling threshold is met and a processing time threshold is met; and
approximate at least one centrality metric for each node in the plurality of nodes based on the computed graph distances.

7. The data visualization system of claim 6, wherein the minimum sampling threshold is 1024 nodes; and wherein the processing time threshold is 10 seconds.

8. The data visualization system of claim 1, wherein the data visualization application directs the at least one processor to prune the reverse index by removing key-value pairs having a length of the value greater than 10% of the size of the set of nodes.

9. A data visualization method comprising:
obtaining a graph comprising a plurality of nodes and a plurality of edges;
obtaining a tabular data structure having a plurality of rows and a plurality of columns;
identifying a node column from the plurality of columns;
identifying a plurality of associative columns from the plurality of columns;
generating a set of nodes based on values in the node column, where each node in the set of nodes represents a value in the node column without duplication;
constructing a reverse index of the tabular data structure, where:
the reverse index comprises a set of key-value pairs;
a key in a given key-value pair is a given value from the plurality of associative columns without duplication; and
a value in the given key-value pair is a list of values from the node column that appear on the same row as the given value from the plurality of associative columns without duplication;
constructing a set of edges based on the reverse index, where each edge in the set of edges is constructed by connecting every combination of node values in the value of each key-value pair;
constructing an edgelist from the set of edges, where the edgelist comprises a list of every edge in the set of edges;
replacing edges in the edgelist having identical endpoints with a single edge, where a weight of the replacement edge is equal to the sum of edge weights of the replaced edges;
constructing a graph comprising a plurality of nodes and a plurality of edges, where the plurality of nodes is constructed using nodes in the set of nodes, and the plurality of edges is constructed using edges in the edgelist to connect nodes in the set of nodes;
identifying a plurality of communities in the graph, where each community comprises nodes from the plurality of nodes;
generating a community graph structure based on the identified communities;
where the community graph comprises a plurality of supernodes and a plurality of superedges;
where each supernode in the plurality of supernodes represents nodes in the plurality of nodes being part of the same community; and
where each superedge in the plurality of superedges connects two supernodes, and represents edges in the plurality of edges connecting nodes represented by the two supernodes;
spatializing the community graph structure;
unpacking the spatialized community graph structure into an unpacked graph structure comprising the plurality of nodes and the plurality of edges, where each node in the plurality of nodes is located at approximately the position of the supernode that represented it;
spatializing the unpacked graph structure; and
providing the spatialized unpacked graph structure.

10. The data visualization method of claim 9, further comprising providing the spatialized unpacked graph structure via a display.

11. The data visualization method of claim 9, wherein identifying communities in the graph comprises:

generating a plurality of community labels via application of Markov Clustering, where each node in the plurality of nodes is assigned a label from the plurality of community labels; and refining the assignment of community labels via Louvain Modularity.

12. The data visualization method of claim 11, wherein a pruning threshold for the Markov Clustering is equal to the lesser of the number of nodes in the plurality of nodes and a size of a GPU memory×$10^6$/50×the number of nodes in the plurality of nodes.

13. The data visualization method of claim 11, wherein the Markov Clustering is applied for between 3 and 15 iterations.

14. The data visualization method of claim 9, further comprising approximating a centrality metric for each given community node in the spatialized unpacked graph structure by:

randomly sampling a portion of the plurality of nodes without replacement;

computing graph distance from each sampled node to each given community node in the spatialized unpacked graph structure;

randomly resampling the remaining portion of the plurality of nodes without replacement and computing graph distance until a minimum sampling threshold is met and a processing time threshold is met; and approximating at least one centrality metric for each node in the plurality of nodes based on the computed graph distances.

15. The data visualization method of claim 14, wherein the minimum sampling threshold is 1024 nodes; and wherein the processing time threshold is 10 seconds.

16. The data visualization method of claim 9, further comprising pruning the reverse index by removing key-value pairs having a length of the value greater than 10% of the size of the set of nodes.

* * * * *